US010257347B2

(12) United States Patent
Gongaware et al.

(10) Patent No.: US 10,257,347 B2
(45) Date of Patent: *Apr. 9, 2019

(54) PERSONAL ALLOWED NUMBER SYSTEM

(71) Applicant: Intelmate LLC, San Francisco, CA (US)

(72) Inventors: Grant Gongaware, Alameda, CA (US); Kevin O'Neil, Parma, ID (US); Richard Torgersrud, San Francisco, CA (US); Nicolas Garcia, Oakland, CA (US); Morgan Collins, San Francisco, CA (US); Kevin E. Krauss, San Francisco, CA (US)

(73) Assignee: INTELMATE LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,491

(22) Filed: Mar. 7, 2017

(65) Prior Publication Data

US 2017/0279961 A1    Sep. 28, 2017

Related U.S. Application Data

(63) Continuation of application No. 15/162,153, filed on May 23, 2016, now Pat. No. 9,591,126, which is a continuation of application No. 14/561,979, filed on Dec. 5, 2014, now Pat. No. 9,350,856, which is a continuation of application No. 13/602,837, filed on Sep. 4, 2012, now Pat. No. 8,938,054.

(60) Provisional application No. 61/530,331, filed on Sep. 1, 2011.

(51) Int. Cl.
| | |
|---|---|
| *H04M 1/57* | (2006.01) |
| *H04M 3/38* | (2006.01) |
| *H04M 3/42* | (2006.01) |
| *H04M 1/663* | (2006.01) |
| *H04M 11/00* | (2006.01) |
| *H04M 3/436* | (2006.01) |

(52) U.S. Cl.
CPC ............. *H04M 3/382* (2013.01); *H04M 3/38* (2013.01); *H04M 3/4211* (2013.01); *H04M 3/42102* (2013.01); *H04M 3/436* (2013.01); *H04M 11/00* (2013.01); *H04M 1/576* (2013.01); *H04M 1/663* (2013.01); *H04M 3/42059* (2013.01); *H04M 2203/6045* (2013.01); *H04M 2203/6072* (2013.01); *H04M 2203/6081* (2013.01)

(58) Field of Classification Search
CPC combination set(s) only.
See application file for complete search history.

(56) References Cited

U.S. PATENT DOCUMENTS

| | | | |
|---|---|---|---|
| 7,505,573 | B2 | 3/2009 | Leonard |
| 7,529,357 | B1 | 5/2009 | Rae et al. |
| 8,340,260 | B1 | 12/2012 | Rae et al. |
| 8,938,054 | B2 | 1/2015 | Gongaware et al. |
| 9,350,856 | B2 | 5/2016 | Gongaware et al. |
| 9,591,126 | B2 | 3/2017 | Gongaware et al. |

(Continued)

*Primary Examiner* — Phung-Hoang J Nguyen
(74) *Attorney, Agent, or Firm* — Venable LLP; Jeffri A. Kaminski

(57) ABSTRACT

A system and method for preventing or facilitating communications between individuals who reside in detention environments (such as e.g., prisons or correctional facilities) and individuals who are not in such detention environments using an automated authentication or verification.

10 Claims, 4 Drawing Sheets

(56) References Cited

U.S. PATENT DOCUMENTS

| | | |
|---|---|---|
| 2003/0002639 A1 | 1/2003 | Huie |
| 2005/0195951 A1 | 9/2005 | Bunker |
| 2006/0169768 A1* | 8/2006 | Gangi ................. G06Q 20/108 |
| | | 235/380 |
| 2006/0184575 A1 | 8/2006 | Singleton |
| 2007/0041545 A1 | 2/2007 | Gainsboro |
| 2008/0057976 A1 | 3/2008 | Rae et al. |
| 2009/0177626 A1 | 7/2009 | Lottero |
| 2011/0106894 A1 | 5/2011 | Hodge et al. |
| 2013/0044867 A1* | 2/2013 | Walters ............... H04M 3/2281 |
| | | 379/88.08 |

* cited by examiner

PERSONAL ALLOWED NUMBER SYSTEM

CLAIM OF PRIORITY

This application is a continuation of U.S. patent application Ser. No. 15/162,153, filed on May 23, 2016, which is a continuation of U.S. patent application Ser. No. 14/561,979, filed Dec. 5, 2014, which is a continuation of U.S. patent application Ser. No. 13/602,837, filed Sep. 4, 2012, which claims priority to U.S. Provisional Application Ser. No. 61/530,331, filed on Sep. 1, 2011, the disclosures of which are hereby incorporated by reference in their entireties.

FIELD

Embodiments described herein relate generally to communication systems in detention environments, and more specifically to a system for identifying phone numbers and individuals to prevent or facilitate communication between residents of detention facilities and unauthorized outside parties.

BACKGROUND

Detention environments, such as a jail, prison, detention facility, secured hospital, or addiction treatment facility, house large populations of individuals in confinement, which presents unique administrative challenges. Notably, detention environments require additional levels of monitoring and oversight that are not required when similar services are provided to other populations. In monitoring and overseeing a detention environment, a verification process to establish the truth, accuracy, or validity of an individual's identity is typically required.

In detention environments, detained individuals frequently desire to contact individuals outside the detention environment (outside parties) such as friends or family members. Many detention environment facilities use an allowed contact list to control whom a detained individual may contact on the outside. Allowed contact lists of this type are sometimes referred to as PAN (personal allowed numbers) lists. Lists of this type help prevent inappropriate communications between detained individuals and outside parties who are not deemed appropriate for contact, such as victims, witnesses, judges, and facility staff and their families. For a detained individual to add a name to their allowed contact list, the detained individual is typically required to fill out a paper form or otherwise communicate his request with detention facility staff.

The verification process for verifying the appropriateness of these requested contacts, when it is performed, typically falls on already overburdened facility staff. For example, to manually verify a proposed contact, staff may need to research the individual or phone number in a number of different databases. The staff may also need to call the proposed phone number. The accuracy of the information that is provided relies on the honesty of the individual who provided the information (i.e., an inmate who is dishonest or may not know the correct spelling of the outside party's name), or it may rely on public records associated with simple contact data such as, for example, the registered owner of a telephone number.

Some existing PAN processes require a friend or family member to fill out a form containing, at a minimum, his or her own name, a contact number or email address, and often additional information, such as, for example, a date of birth or physical address. If a form is used, the information is typically vetted by facility staff. Sometimes, the information is simply approved when time or labor is not available. The vetting of requested contacts by staff is time consuming. If forms are filled out by hand, they are usually hand-typed into a computer system for tracking and processing. To fulfill their obligation to the courts and the public, facility staff check the information to ensure that: a) a potentially wide range of conditions are checked and confirmed, and also result in permitted contact, b) the contact or the owner of the contact number matches the information provided, and c) the intended contact grants permission to be contacted by or communicate with the inmate.

The above described processes are overall burdensome, time consuming and subject to errors, which is undesirable. As such, there is a need and desire for a better system and method for creating, monitoring and verifying personal approved number lists, particularly for a detention environment.

SUMMARY

Embodiments disclosed herein relate to the automated management of an allowed contact list for detained individuals. Tracking communications between individuals who reside in a detention environment, such as a detention center, jail, or secure hospital, and outside parties is an important component of detention environment security. In particular, the embodiments disclosed herein relate to the identity verification of people outside a detention environment (i.e., "outside parties") who wish to communicate with detained individuals, or to whom the detained individual wishes to communicate.

The best use of the disclosed system and methods is to verify the identities, in an automated fashion, of friends and family members of detained individuals when a communication attempt is initiated between the detained individual and one of those outside parties. Desirably, the verified identities are also compared with other data sources, such as a list of judges, jail staff, and victims, to further verify that a communication between the parties is permitted. Additionally, information is subjected to rules, such as, without limitation, the facility rules where the detained individual is detained, applicable court rules and/or laws, to name a few. For example, a rule may ensure that a convicted sex offender is not contacting a minor. Moreover, it is desirable that the detention facility's staff, or other investigators, are capable of using the verified identities of the outside parties/individuals that are communicating with detainees or with whom such communication is attempted, as well as destination numbers contacted or attempted to be contacted, as part of future investigations.

DETAILED DESCRIPTION

Figure 1:
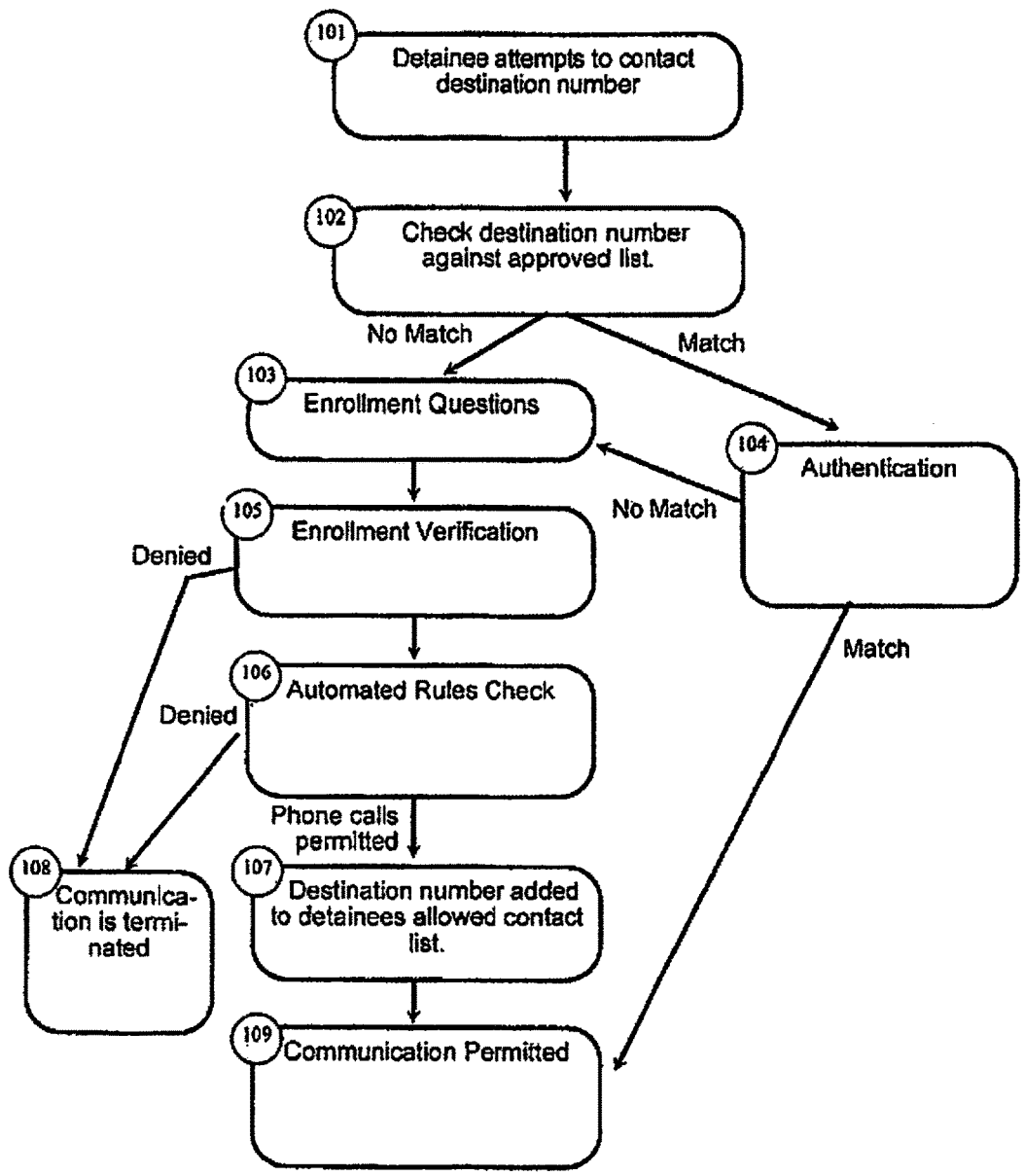
FIG. 1 shows a process flow for a person residing in a detention environment who wishes to communicate with a person outside of the detention environment, in accordance with an embodiment disclosed herein.

Embodiments disclosed herein automate the verification of new contacts for detained individuals. Detained individuals can initiate the process of adding a new contact to their allowed contact list (i.e., a PAN list) simply by attempting to contact the outside party, such as through a phone call attempt, or video visit request. The embodiments disclosed herein subject the requested contact (i.e., the outside party) to an automated verification process, which may request uniquely identifying information, such as e.g., name, age and zip code, and checks this information against available information sources (databases), for information such as e.g., known sex offenders, gang members, felons, facility employees, witnesses and victims.

Verification may include comparing provided information with information available from both private and public databases including, but not limited to, Line Information Databases (LIDB) information to find phone numbers and address associations, Best Known Name and Address (BKNA) information to associate names with addresses, identification verification information to match a provided name with digits of a social security number or other unique participant-assigned number, national financial information with any existing financial records, national passport database, other government issued ID databases such as a drivers' license database, military ID database, state issued ID card database, open warrants database, national victim notification networks such as VINE or VINELink, or "do not contact" databases.

As part of the enrollment process disclosed herein, the participant may be required or permitted to establish a username and password, or a unique personal identification phrase, number, or series of characters. As part of one possible alternate process, a series of numbers, such as the last four digits of the individual's social security number, may be used for future identification.

It may be the case that data, such as e.g., a phone number, associated with the verified individual, is found to be associated with previous phone calls or other communications made by a person in a detention environment. If this is the case, then the system may associate those previous communications with the new verified identity information, allowing the system to retroactively link a detained individual in a detention environment to a specific verified outside party through the phone number. Similar associations could be made through past communications. Thus, it is possible to automatically populate a list entry based on data that already exists in another list, such as a list associated with a different detained individual or a global list. This can help prevent a list from containing incomplete information for a party when additional information for that outside party is available on another list and aid the approval process where the party has already been added to a different list. It also can aid in investigations by recognizing that a party may be in contact with numerous detained individuals and allowing these connections to be identified.

At least two general types of allowed contact lists are described herein. The first list is based on telephone numbers, wherein an allowed call list comprises allowed phone numbers or other destination numbers and addresses (such as by way of example and not limitation, email address, text number, social media account) that a detained individual may contact/call. The second type of allowed contact list is based on the identity of the outside person, wherein this allowed contact list comprises individual identities, which may or may not be connected to specific telephone numbers or other destination numbers or addresses. The process of initiating the automated verification of outside parties may be triggered by detained individuals, such as e.g., a detainee attempting to make a telephone call to a new party, or may be triggered by an outside party, such as a friend of family member, attempting to leave a voicemail for the first time for a newly detained individual.

The embodiments disclosed herein provide several advantages to an investigator trying to connect communications between detained individuals and outside parties. The verification of an outside party's identity allows an investigator to connect an inmate to a specific person, rather than just a phone number, which may be answered by anyone with access to the corresponding telephone. Moreover, an individual with multiple phone numbers may be viewed immediately as a single person, rather than a series of contact addresses, which may represent multiple persons. Additionally, by verifying an individual, it is easier to tie together multiple contacts with multiple addresses, such as phone numbers or email addresses, with multiple detainees and/or with other associated activities such as depositing funds for detained individuals, as further described in U.S. patent application Ser. No. 13/490,054, filed on Jun. 6, 2012, entitled System and Method for Identity Verification in a Detention Environment, the contents of which are incorporated herein by reference.

Communication between those detained individuals residing in a detention environment and outside parties according to the disclosed principles includes telephone calls, but may extend to other methods of communication, as permitted by the associated detention facility, such as e.g., text messages, online chat, video conferencing, email, social media wall posts, or other form of digital or electronic communication.

The intent of the automated process described herein, is to provide an automated means of adding approved contacts to a detained individual's personal allowed number (PAN)/contact list. The disclosed methods and system reduce labor for investigators and staff of detention facilities, and add information that may not be possible to obtain under a traditional manual PAN system. In addition to the automated techniques disclosed herein, contacts can also be added to a detained individual's personal allowed number (PAN)/contact list in other ways such as logging into a website and providing identifying information that can be verified against various databases as discussed herein relative to the automated techniques.

FIG. 1 illustrates a method performed in accordance with the above principles. The method begins by detecting that a detained individual is attempting to contact a destination number (step 101). The method then checks the destination number against the detained individual's current personal allowed number/contact list (step 102). It is also possible to check the destination number against a global list or to check the destination number against one or more lists associated with one or more other detained individuals. In doing so, it is possible to determine if the destination number is verified and approved for contact even when it does not appear on a list specific to the detained individual or in the instance where the detained individual has not yet developed his own allowed number/contact list. Other rules and block lists can be used to disallow contacts in which one detained individual is allowed to contact a specific party while another detained individual is prohibited from contacting that party. Those rules and mechanisms are not the focus of this disclosure and thus are not discussed in detail herein. If there is a match, the communication is authenticated at step 104 and the communication is permitted at step 109. It should be noted that if there is no match at step 102, or if the detained individual does not yet have a personal allowed number/contact list, the method will continue at step 103, where an enrollment process begins. Specifically, at step 103, enrollment questions are posed to the party associated with the destination number. This enrollment process can be accomplished in many ways, including but not limited to, an interactive voice response (IVR) system or through communications with a customer service representative. An enrollment verification process is then performed at step 105. If the enrollment verification process is denied, the method continues at step 108, where the attempted communication is terminated.

If, however, the enrollment verification process is valid, the method continues at step 106 to determine if the detention environment's facility rules will allow the communication (e.g., phone call). Facility rules can be rules defined by the facility, but can also be any rules, including but not limited to rules imposed by state or federal governments, the courts or sentencing guidelines. Furthermore, other rules checks can be performed at various stages of the process in order to ensure all communication guidelines are met. For instance, it is possible to check the destination number against a block list specific to the detained individual or a global "do not call" list between steps 101 and 102 to prevent unwanted contact. Thus, while the rules check 106 is shown at a specific point in the process it can be performed at other points in the process and may include multiple rules checks. If the rules will allow the communication, the destination number is added to the detained individual's allowed number/contact list (or if the detained individual does not yet have a personal allowed number/contact list, a list is created and the destination number and corresponding information is added to the list) at step 107 and the communication is permitted at step 109. If, however, the detention environment's facility rules will not allow the communication (at step 106), the method continues at step 108, where the attempted communication is terminated.

Figure 2:
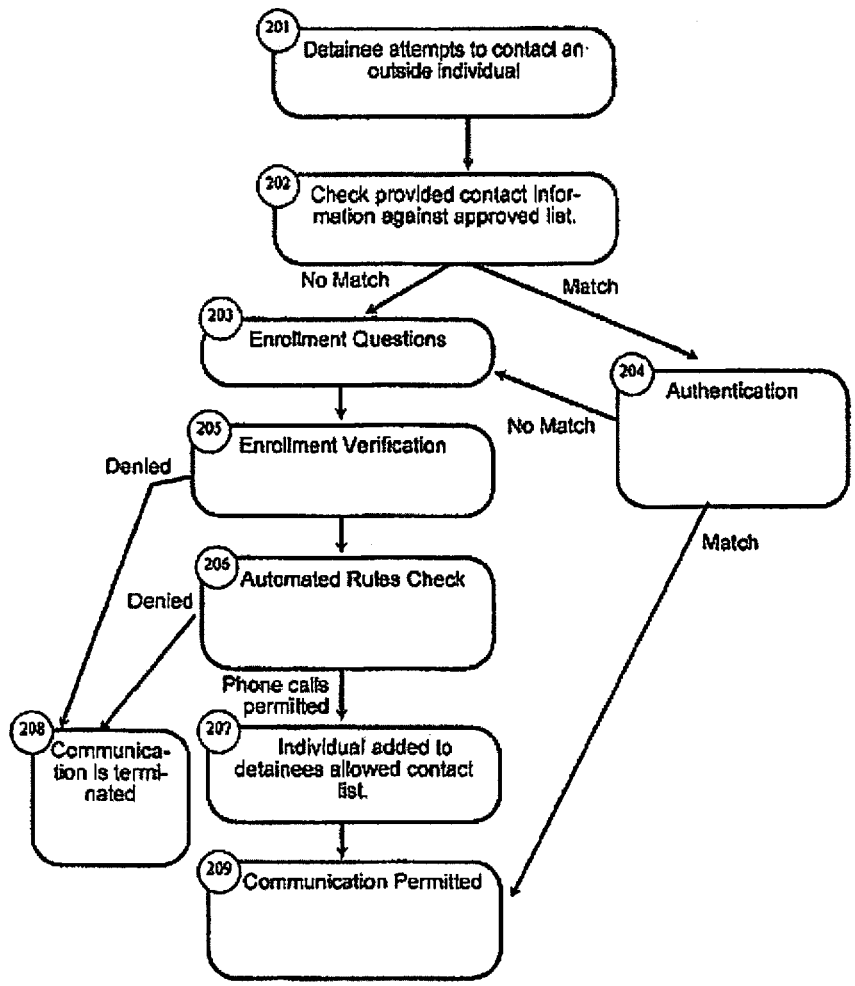
FIG. 2 shows the process flow for a person residing in a detention environment who wishes to communicate with a person outside of the detention environment, in accordance with an embodiment disclosed herein.

FIG. 2 illustrates another method performed in accordance with the above principles. The method begins by detecting that a detained individual is attempting to contact an outside party (step 201). The method then checks the outside party's information against the detained individual's current personal allowed number/contact list (step 202) or other lists as discussed above relative to FIG. 1. If there is a match, the communication is authenticated at step 204 and the communication is permitted at step 209. It should be noted that if there is no match at step 202, or if the detained individual does not yet have a personal allowed number/contact list, the method will continue at step 203, where an enrollment process begins. Specifically, at step 203, enrollment questions are posed to the outside party. An enrollment verification process is then performed at step 205. If the enrollment verification process is denied, the method continues at step 208, where the attempted communication is terminated.

If, however, the enrollment verification process is valid, the method continues at step 206 to determine if the detention environment's facility rules will allow the communication to the outside party (e.g., phone call). The rules can include the same types of rules discussed above relative to step 106. If the detention environment's facility rules will allow the communication, the outside party and any associated information is added to the detained individual's allowed number/contact list (or if the detained individual does not yet have a personal allowed number/contact list, a list is created and the outside party and corresponding information is added to the list) at step 207 and the communication is permitted at step 209. If, however, the detention environment's facility rules will not allow the communication (at step 206), the method continues at step 208, where the attempted communication is terminated.

Figure 3:
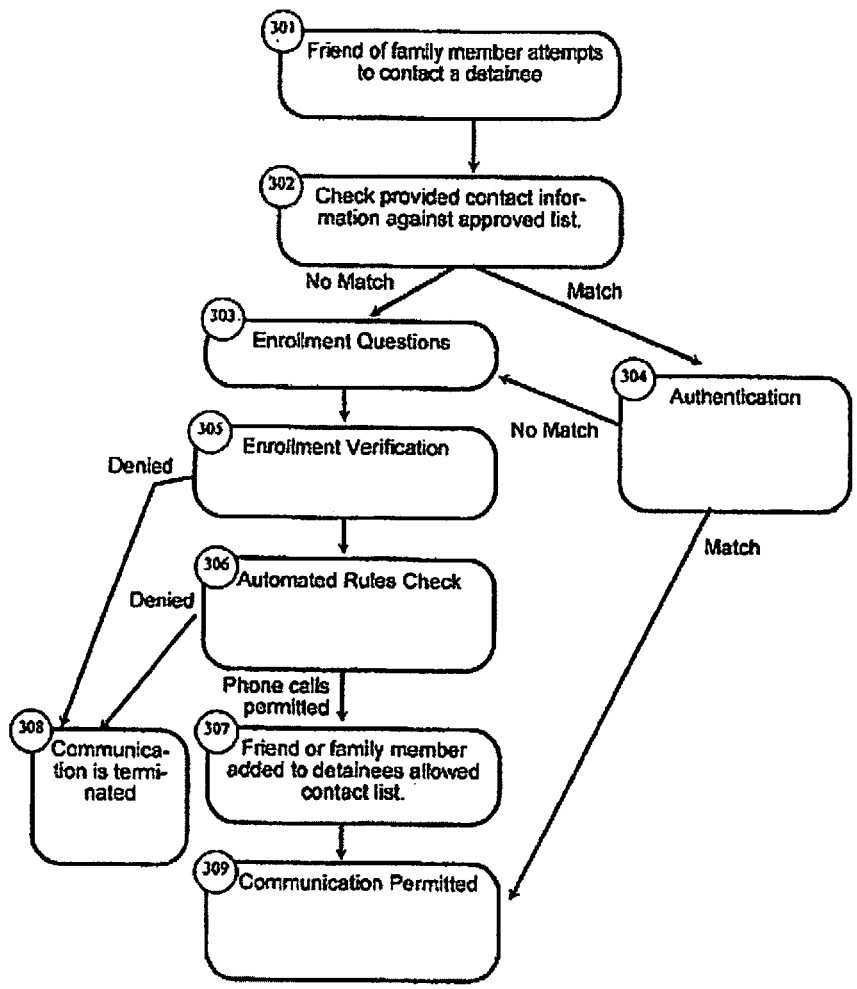
FIG. 3 shows the process flow for a person who does not reside in a detention environment (i.e., an outside party) who wishes to communicate with a person residing in a detention environment, in accordance with an embodiment disclosed herein.

FIG. 3 illustrates another method performed in accordance with the above principles. The method begins by detecting that an outside party, such as the friend or family member of a detained individual, is attempting to contact the detained individual (step 301). The method then checks the provided contact information against the detained individual's current personal allowed number/contact list (step 302). If there is a match, the communication is authenticated at step 304 and the communication is permitted at step 309. It should be noted that if there is no match at step 302, or if the detained individual does not yet have a personal allowed number/contact list, the method will continue at step 303, where an enrollment process begins. Specifically, at step 303, enrollment questions are posed to the friend, family member or other outside party. An enrollment verification process is then performed at step 305. If the enrollment verification process is denied, the method continues at step 308, where the attempted communication is terminated.

If, however, the enrollment verification process is valid, the method continues at step 306 to determine if the detention environment's facility rules will allow the communication (e.g., phone call) from the friend, family member or other outside party. The rules can include the same types of rules discussed above relative to steps 106 and 206. If the detention environment's facility rules will allow the communication, then the friend, family member or other outside party and corresponding information are added to the detained individual's allowed number/contact list (or if the detained individual does not yet have a personal allowed number/contact list, a list is created and the friend, family member or other outside party and corresponding information are added to the list) at step 307 and the communication is permitted at step 309. If, however, the detention environment's facility rules will not allow the communication (at step 306), the method continues at step 308, where the attempted communication is terminated.

For security purposes it also possible to require a party to answer security questions or otherwise verify their identity prior to allowing a communication between the party and a detained individual. By utilizing this additional information, rather than relying merely, for instance, on a telephone number, the system and methods disclosed herein are capable of verifying that the party is actually the individual whom has been approved for contact and is not simply calling from an approved party's telephone.

Figure 4:
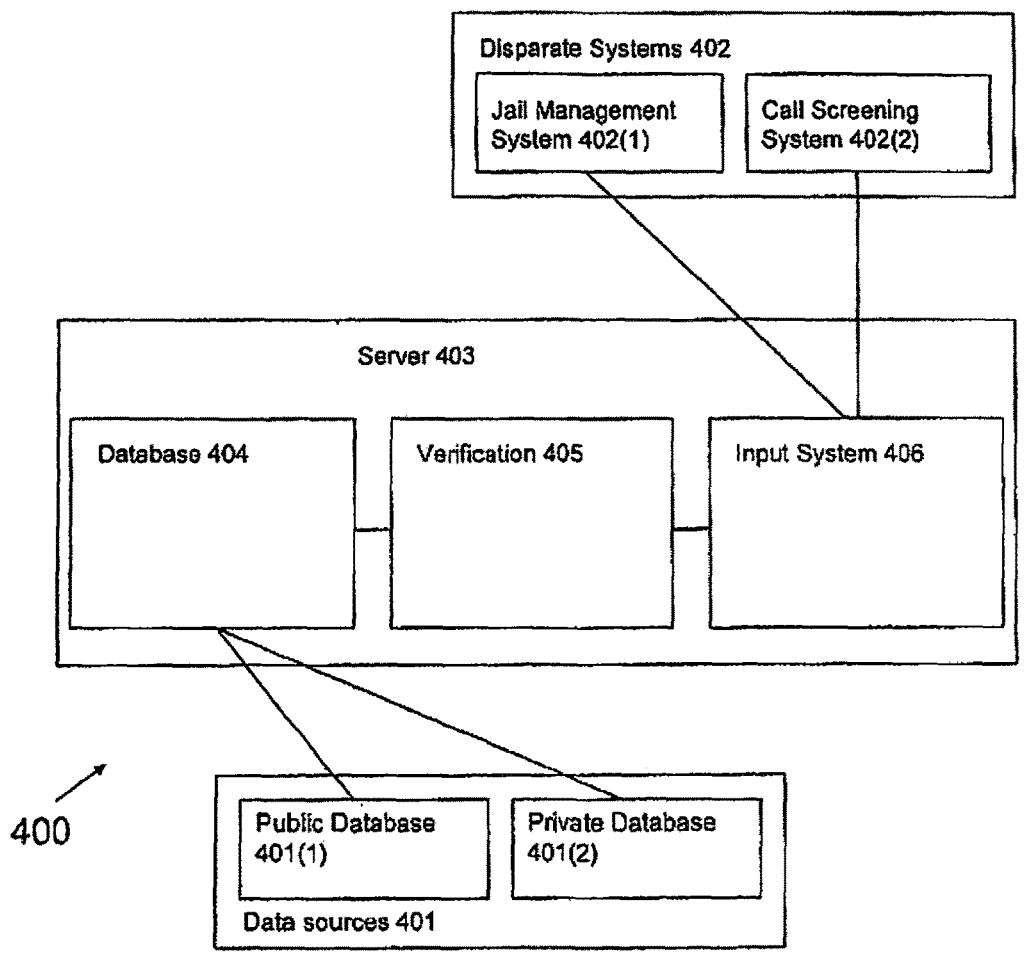
FIG. 4 illustrates an example system constructed in accordance with an embodiment disclosed herein.

The aforementioned methods may be performed by a system such as the one disclosed in U.S. patent application Ser. No. 13/490,054. FIG. 4 is a diagram illustrating an example embodiment of such a system 400 according to aspects of the present disclosure. The system 400 includes a server 403 comprising a database 404, a verification system 405, and an input system 406. The server 403 is programmed to perform one, all, or a combination of the methods discussed above. The database 404 is populated with identity information from various data sources 401, such as, a public database 401(1) or a private database 401(2). As discussed above, the public databases 401(1) may include a Line Information Databases, Best Known Name and Address database, social security database, national financial information database, national passport database, government issued identification database, warrants database, national victim network database, or "do not contact" database. Private databases 401(2) may include databases aggregated by the detention environment itself. In some cases the identity information from the data source 401 existed prior to the individual's interaction with the individual subject to the detention environment. The database 404 may also be populated by the data sources upon command, at intervals, or dynamically.

The system 400 is preferably compatible with data sources 401, such as e.g., the interactive audio/video system and device for use in a detention environment disclosed in U.S. patent application Ser. No. 13/088,883, the consolidated voicemail platform disclosed in U.S. patent application Ser. No. 12/826,168, an information exchange facilitating system such as e.g., the secure social network disclosed in U.S. patent application Ser. No. 13/438,940, each of which is hereby incorporated by reference in their entirety.

When an individual inputs information through one of the disparate systems 402 for managing detention environment interactions, such as a jail management system 402(1) or call screening system 402(2), the server 403 receives that information through its input system 406. The verification system 405 takes the information obtained through the input system 406 and verifies the identifying information by matching it with the information stored in the database 404.

In accordance with the practices of persons skilled in the art of computer programming, embodiments of the methods are described with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits. Embodiments may also encompass integrated circuitry including circuit elements capable of performing specific system operations.

When implemented in a programmed device or system, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While various embodiments have been described above, it should be understood that those embodiments have been presented by way of example only and are not meant to limit the claims below. Thus, the breadth and scope of the invention should not be limited by the specific embodiments discussed above, but only according to the claims and their equivalents.

What is claimed is:

1. A method of identifying a called party comprising:
authenticating a detained individual's login credential;
receiving a telephone number dialed by the detained individual;
determining that the telephone number is not in a database of allowed contacts using a processor configured to access one or more remote databases;
calling the telephone number to request personal identifying information from the called party over a telephone call;
receiving personal identifying information from the called party over the telephone call;
matching the received personal identifying information against one or more remote databases to verify the personal identifying information using the processor;
asking additional questions during the telephone call to verify any personal identifying information that was not verified;
adding the called party to the database of allowed contacts once the personal identifying information is verified, wherein
the personal identifying information is verified prior to allowing communication between the detained individual and the called party; and
on detecting subsequent communication between the detained individual and the called party, authenticating the subsequent communication with one or more security questions.

2. The method of claim 1, wherein the received personal identifying information is a photograph of the called party and a scan of a driver's license.

3. The method of claim 1, wherein the step of matching the received personal identifying information against the remote database further includes matching the received personal identifying information against one or more additional remote databases storing additional personal identifying information to verify the personal identifying information.

4. A method of facilitating communication via a list of allowed destination numbers to which a detained individual residing in a detention environment is permitted to communicate, said method comprising:
detecting a contact initiated by the detained individual to a destination number of a recipient;
automatically checking the destination number to determine that the destination number is not on at least one of the list of allowed destination numbers associated with the detained individual, a list of allowed destination numbers associated with one or more different detained individuals or a general list of allowed destination numbers using a processor configured to access a one or more remote databases;
conducting an initial enrollment process for the recipient of the detected contact using the processor, wherein the initial enrollment process involves receiving personal identifying information comprising a name, an age, and a zip code from the recipient;
matching the received personal identifying information against the one or more remote databases using the processor to verify the personal identifying information;
automatically associating the recipient with the destination number once the personal identifying information received from the recipient during the enrollment process is approved;

adding the destination number to list of allowed destination numbers;

permitting the communication to the allowed destination number only after the destination number is added to the list of allowed destination numbers; and on detecting subsequent communication between the detained individual and the recipient, authenticating the subsequent communication with one or more security questions.

5. The method of claim 4, wherein the destination number added to the allowed list of destination numbers is a phone number.

6. The method of claim 4 wherein the enrollment process is approved when the received personal identifying information comprising a name, an age, and a zip code of the recipient at least partly matches corresponding personal identifying information obtained from sources other than the recipient.

7. A method of adding approved individuals to an approved contact list containing contacts with whom a detained individual residing in a detention environment is permitted to communicate, said method comprising:

detecting a communication initiated between the detained individual and an outside party who is not a resident of the detention environment, the outside party having an identity;

attempting to authenticate the outside party by automatically comparing provided outside party information with stored outside party information within at least one of the approved contact list associated with the detained individual, an approved contact list associated with one or more different detained individuals or a general list of allowed contact numbers using a processor configured to access one or more remote databases;

determining that the provided outside party information does not match the stored outside party information;

automatically attempting to verify the identity of the outside party by requesting personal identifying information comprising a name, an age, and a zip code of the outside party from the outside party;

comparing the provided personal identifying information against the one or more remote databases;

determining whether applicable rules permit communication with the outside party;

adding the outside party to the approved contact list associated with the detained individual when the identity of the outside party is verified and the applicable rules permit communication with the outside party, wherein the personal identifying information is verified prior to allowing communication between the detained individual and the outside party; and on detecting subsequent communication between the detained individual and the outside party, authenticating the subsequent communication with one or more security questions.

8. The method of claim 7, wherein the detected communication comprises a phone call.

9. The method of claim 7, wherein the detected communication comprises a text message, online chat, video conference, email, social media wall post, or other digital communication.

10. The method of claim 7, wherein when the detained individual and the outside party are still available after the outside party is initially added to the detained individual's allowed contact list, said method allows the communication to take place.

* * * * *